United States Patent
Quasthoff et al.

(10) Patent No.: US 9,009,042 B1
(45) Date of Patent: Apr. 14, 2015

(54) MACHINE TRANSLATION OF INDIRECT SPEECH

(71) Applicant: Google Inc., Mountain View, CA (US)

(72) Inventors: Matthias Quasthoff, London (GB); Simon Tickner, Whitstable (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/304,160

(22) Filed: Jun. 13, 2014

Related U.S. Application Data (63) Continuation of application No. 13/872,583, filed on Apr. 29, 2013, now Pat. No. 8,768,687.

(51) Int. Cl.
*G10L 15/00* (2013.01)
*G10L 15/26* (2006.01)

(52) U.S. Cl.
CPC ...................................... *G10L 15/26* (2013.01)

(58) Field of Classification Search
USPC ............. 704/257, 9, 239, 235, 201, 275, 260, 704/231; 705/26.1; 715/705, 202, 205; 709/203; 379/142.14, 88.04
See application file for complete search history.

(56) References Cited

U.S. PATENT DOCUMENTS

| | | | | |
|---|---|---|---|---|
| 5,799,268 | A * | 8/1998 | Boguraev ............................ | 704/9 |
| 6,532,444 | B1 * | 3/2003 | Weber ............................ | 704/257 |
| 6,871,179 | B1 * | 3/2005 | Kist et al. ...................... | 704/275 |
| 7,627,466 | B2 * | 12/2009 | Ramsey et al. ................... | 704/9 |
| 7,672,436 | B1 * | 3/2010 | Thenthiruperai et al. | 379/88.04 |
| 7,809,570 | B2 * | 10/2010 | Kennewick et al. .......... | 704/257 |
| 8,195,457 | B1 * | 6/2012 | Lagassey ...................... | 704/235 |
| 8,370,147 | B2 * | 2/2013 | Kennewick et al. .......... | 704/257 |
| 8,370,148 | B2 * | 2/2013 | Schroeter ...................... | 704/260 |
| 8,401,848 | B2 * | 3/2013 | Dowlatkhah ................... | 704/235 |
| 8,543,394 | B2 * | 9/2013 | Shin .............................. | 704/235 |
| 8,620,652 | B2 * | 12/2013 | Chambers et al. ............. | 704/231 |
| 8,898,065 | B2 * | 11/2014 | Newman et al. ............... | 704/275 |
| 2004/0054524 | A1 * | 3/2004 | Baruch .......................... | 704/201 |
| 2004/0083092 | A1 * | 4/2004 | Valles .............................. | 704/9 |
| 2005/0201540 | A1 * | 9/2005 | Rampey et al. .......... | 379/142.14 |
| 2005/0228860 | A1 * | 10/2005 | Hamynen et al. ............. | 709/203 |
| 2006/0136352 | A1 * | 6/2006 | Brun et al. ........................ | 707/1 |
| 2007/0204211 | A1 * | 8/2007 | Paxson ....................... | 715/501.1 |
| 2009/0113279 | A1 * | 4/2009 | Monro et al. ................. | 715/202 |
| 2011/0112921 | A1 * | 5/2011 | Kennewick et al. ......... | 705/26.1 |
| 2011/0307779 | A1 * | 12/2011 | Scholler et al. ............... | 715/705 |
| 2012/0191453 | A1 * | 7/2012 | Roberge et al. ............... | 704/239 |
| 2012/0265528 | A1 * | 10/2012 | Gruber et al. ................. | 704/235 |

\* cited by examiner

*Primary Examiner* — Michael Colucci (74) *Attorney, Agent, or Firm* — Fish & Richardson P.C.

(57) ABSTRACT

Methods, systems, and apparatus, including computer programs encoded on a computer storage medium, for generating direct speech messages based on voice commands that include indirect speech messages. In one aspect, a method includes receiving a voice input corresponding to an utterance. A determination is made whether a transcription of the utterance includes a command to initiate a communication to a user and a segment that is classified as indirect speech. In response to determining that the transcription of the utterance includes the command and the segment that is classified as indirect speech, the segment that is classified as indirect speech is provided as input to a machine translator. In response to providing the segment that is classified as indirect speech to the machine translator, a direct speech segment is received from the machine translator. A communication is initiated that includes the direct speech segment.

20 Claims, 4 Drawing Sheets

MACHINE TRANSLATION OF INDIRECT SPEECH

CROSS-REFERENCE TO RELATED APPLICATION

This application is a continuation of U.S. application Ser. No. 13/872,583, filed Apr. 29, 2013, the contents of which is incorporated by reference.

BACKGROUND

The advent of mobile phones, and especially smartphones, has made it made is easier for people to communicate with one another. Two popular communication mechanisms facilitated by smartphones are text messaging and e-mail. Some smartphones include voice to text programs that allow users to send text-based messages by speaking voice commands. However, these programs require users to speak unnatural commands followed by an exact direct speech message that the user wants to send. For example, the user may be required to state the command "Send e-mail message to John Smith" followed by the intended message, such as "Can you meet for lunch." This can seem awkward and unnatural to the user.

SUMMARY

In general, one innovative aspect of the subject matter described in this specification can be embodied in methods that include the actions of receiving a voice input corresponding to an utterance; determining whether a transcription of the utterance includes a command to initiate a communication to a user and a segment that is classified as indirect speech; in response to determining that the transcription of the utterance includes the command and the segment that is classified as indirect speech: providing the segment that is classified as indirect speech as input to a machine translator; in response to providing the segment that is classified as indirect speech to the machine translator, receiving a direct speech segment from the machine translator; and initiating a communication that includes the direct speech segment. Other embodiments of this aspect include corresponding systems, apparatus, and computer programs, configured to perform the actions of the methods, encoded on computer storage devices.

These and other embodiments can each optionally include one or more of the following features. Aspects can further include determining that the transcription includes the command to initiate the communication and a segment that is classified as direct speech; and in response to determining that the transcription includes the command to initiate the communication and the segment that is classified as direct speech, initiating a communication that includes the segment that is classified as direct speech.

The machine translator can determine a semantic meaning of the segment that is classified as indirect speech. The machine translator can also generate the direct speech segment to include a meaning that matches the semantic meaning of the segment that is classified as indirect speech. The machine translator can apply a set of grammar rules to the segment that is classified as indirect speech to convert the segment that is classified as indirect speech to the direct speech segment.

Determining whether the transcription includes a segment that is classified as indirect speech can include identifying a transitional word disposed between the command and a segment of the transcription and determining whether the segment of the transcription includes an indirect speech segment.

Aspects can further include identifying a portion of the transcription as a candidate indirect speech segment; determining a confidence score for the candidate indirect speech segment, the confidence score specifying a measure of confidence that the candidate indirect speech segment is an indirect speech segment; determining that the confidence score satisfies a confidence threshold; and classifying the candidate indirect speech segment as indirect speech in response to the confidence score satisfying the confidence threshold.

The machine translator can convert the segment that is classified as indirect speech to the direct speech segment by adjusting an order of words in the segment that is classified as indirect speech to generate the direct speech segment. The machine translator can convert the segment that is classified as indirect speech to the direct speech segment by replacing a word of the segment that is classified as indirect speech with another word different than the word to generate the direct speech segment.

Aspects can further include providing the communication including the direct speech segment for confirmation prior to sending the communication; receiving confirmation data indicating that the communication has been confirmed; and sending the communication in response to receiving the confirmation data.

Particular embodiments of the subject matter described in this specification can be implemented so as to realize one or more of the following advantages. Users can initiate communications to other users using more natural speech, rather than being required to speak particular command phrases and their message in a direct speech format. Users can more quickly provide voice commands as they are not required to provide two distinct phrases, a particular command phrase and a message phrase. A machine translator can provide accurate translations of indirect speech to direct speech for use in communications initiated by voice.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system can generate a communication, such as a text message, that includes a direct speech segment based on a transcription of a voice input that includes a segment classified as indirect speech. Direct speech is typically in the form that a person would use when speaking directly to another person. For example, the question "are you free at noon today?" may be considered direct speech as it is in the form that the speaker would use in asking another person whether that person is free at noon. Conversely, indirect speech is typically in the form that a person would use when reporting a message to another person, or requesting another person (or object) to report a message. For example, the question "ask Tom if he is free at noon today" is considered indirect speech as it is in the form of a request for another person to ask Tom if he is free. Similarly, the statement "Tom said he was free" is considered indirect speech as it reports a message from another user and is not a direct quote of the message from the other user.

Rather than requiring a user to speak a certain command followed by a direct speech message that the user wants to send, the system can receive a more natural voice input that includes indirect speech and generate a message based on the voice input. For example, instead of requiring a user to speak a particular command (e.g., "Send text message to Peter") followed by a particular direct speech message (e.g., "What time do you want to meet"), the system can accept a natural voice input, such as "Ask Peter what time does he want to meet." In this example, the message "what time does he want to meet" may be classified as indirect speech. The system can process the input to generate a communication that includes direct speech, such as "What time do you want to meet?" and send the communication to the desired user, e.g., Peter.

Figure 1:
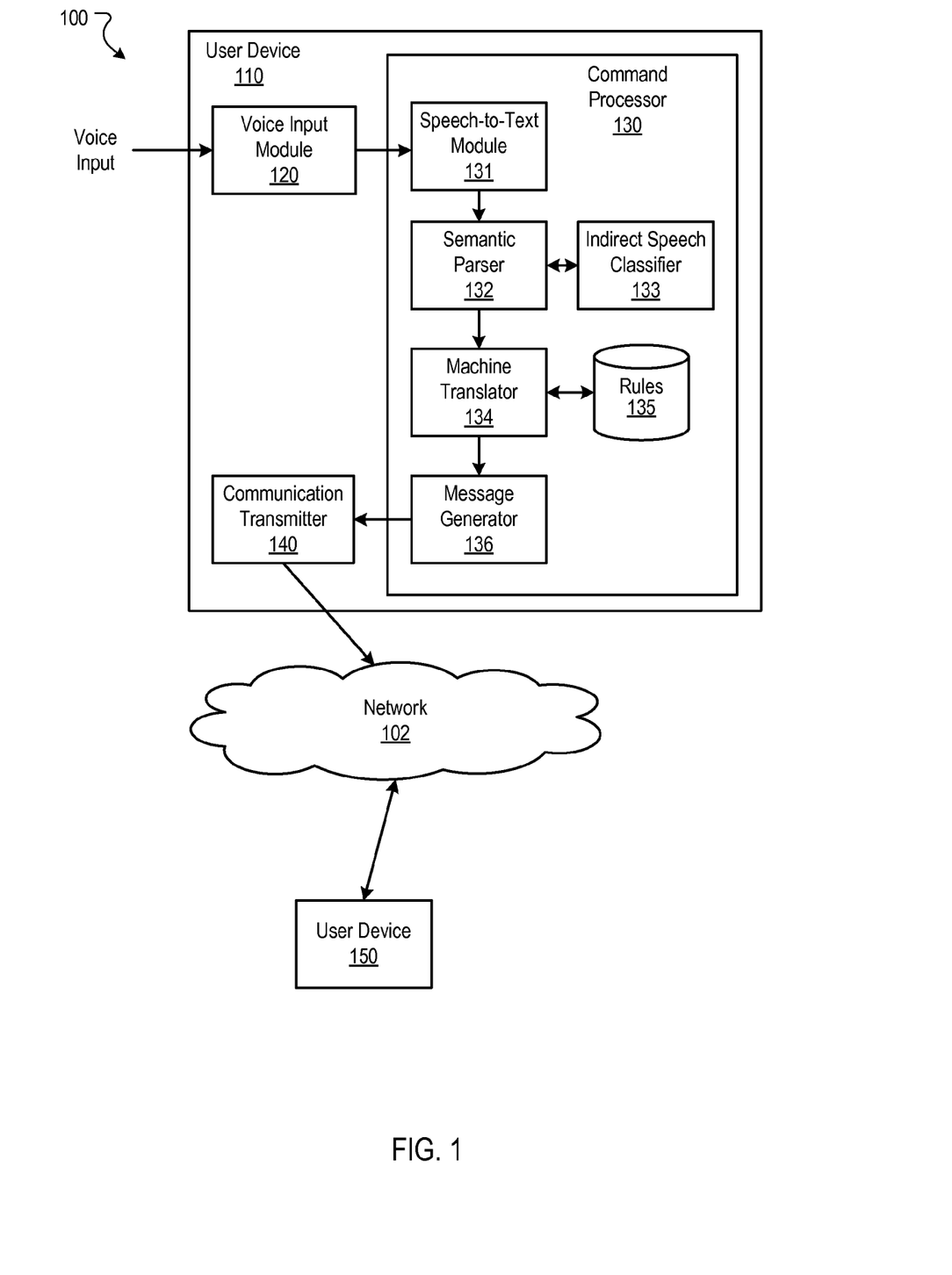
FIG. 1 is an example environment in which a user device generates and sends communications based on voice inputs.

FIG. 1 is an example environment 100 in which a user device 110 generates and sends communications based on voice inputs. A data communication network 102 enables data communication and optionally voice communication between multiple electronic devices. For example, the network 102 enables the user device 110 to send and receive communications, such as text messages, e-mail messages, and voice messages to other user devices, such as the user device 150. The network 102 can include, for example, a local area network (LAN), a mobile network (e.g., cellular phone network), a wide area network (WAN), e.g., the Internet, or a combination of them. The network 102 can be accessed over a wired and/or a wireless communications link. For example, mobile computing devices, such as smartphones can utilize a mobile network to access the network 102.

The user device 110 is an electronic device that is capable of sending and receiving data over the network 102. Example user devices 110 include mobile communication devices, e.g., smartphones and/or tablet computing devices, personal computers, and other devices that can send and receive data over the network 102. As used throughout this document, the term mobile computing device ("mobile device") refers to a user device that is configured to communicate over a mobile communications network. A smartphone, (i.e., a phone that is enabled to communicate over the Internet) is an example of a mobile device. A user device 110 typically includes a user application, e.g., a web browser, an e-mail application, and/or a text messaging application, to facilitate the sending and receiving of data over the network 102.

The user device 110 also includes a voice input module 120, a command processor 130, and a communication transmitter 140 for generating and sending communications based on voice inputs. The voice input module 120 receives voice inputs, for example that correspond to an utterance made by a user. The voice input module 120 can include a microphone that converts voice inputs made by a user into an electronic signal that corresponds to the utterance. The voice input module 120 can provide the corresponding signal to the command processor 130.

In some implementations, the voice input module 120 provides the electronic version of the voice input to the command processor 130 when the user device 110 is in a voice command mode of operation. For example, a user can place the user device 110 in a voice command mode when the user wants to send messages to other users by way of voice input. While in the voice command mode, electronic versions of utterances detected by the voice input module 120 are provided to the command processor 130.

The command processor 130 generates messages based on the electronic version of the voice input received from the voice input module 120. A speech-to-text module 131 generates text based on the voice input. For example, the speech-to-text module 131 can generate a transcription of the electronic version of the voice input. The transcription can include each word included in the speech input and in the order in which the words were spoken. The text-to-speech module 131 provides the transcription to a semantic parser 132.

The semantic parser 132 can identify particular segments of the transcription, for example based on semantics and/or syntactic structure of the transcription. In some implementations, the semantic parser 132 evaluates the transcription to identify a meaning for portions of the transcription and identifies the segments based on these meanings. For example, the semantic parser 132 may identify a portion of a transcription that has a meaning related to initiating a communication, such as "Tell Jim" or "Ask him." Based on this identified meaning, the semantic parser 132 may classify that portion of the transcription as a command segment for initiating a communication.

In some implementations, the semantic parser 132 may identify a portion of a transcription as a command segment if the portion includes certain keywords or phrases. For example, the keywords, "tell," "ask," and "send a text," may indicate that the user is requesting that the user device 110 send a message to another user.

The semantic parser 132 may also identify a portion of the transcription as a message segment based on the meaning of the portion and/or based on the syntactic structure of the portion. For example, the semantic parser 132 may determine that a portion of the transcription is a statement or a question that may be directed to another user. Based on this determination, the semantic parser 132 can classify the portion of the transcription as a message segment.

In addition, or in the alternative, the semantic parser 132 may identify a message segment based on an identification of a command segment within the transcription. If the transcription includes a command segment for initiating a communication, the semantic parser 132 may conclude that the transcription likely also includes a message segment. In response to this conclusion, the semantic parser 132 may evaluate the transcription to identify a transitional word disposed between the command segment and another portion of the transcription. The transitional word may indicate that the portion other than the command segment and the transitional word is a message segment. Example transitional words include "to" and "that," to name just a couple.

Consider an example transcription of a voice input, "Remind John that he has an appointment at four." The semantic parser 132 may determine that the portion, "Remind John," is a command segment. The semantic parser 132 may also determine that the word "that" is a transitional word disposed between the command segment and another portion of the transcription. Based on these determinations and optionally an identified meaning for the other portion, the semantic parser 132 may identify the portion "he has an appointment at four" as a message segment.

A transitional word or conjunction, such as "that" may also be part of a message segment. For example, the word "that" in the transcription "Tell Amy that movie was excellent" is part of the message rather than a transitional word. The semantic parser 132 can evaluate the meaning of the segment with and without a potential transitional word to determine whether the word is a transitional word or part of the message segment.

The semantic parser 132 can also interact with an indirect speech classifier 133 to determine whether a message segment is in an indirect speech format or a direct speech format. For example, the indirect speech classifier 133 may evaluate the message segment to determine whether the message should be classified as indirect speech or direct speech and classify the message accordingly. To classify the message segment, the indirect speech classifier 133 may evaluate characteristics of the message segment and/or the command segment. Example characteristics that may be evaluated include the syntactic structure of the message segment and optionally the syntactic structure of the command segment. For example, the indirect text classifier 133 may evaluate whether the segment(s) includes a content clause, the form of verbs in the segment(s), whether the segment(s) includes personal pronouns, and/or whether the message segment(s) includes the pronoun "you."

In a transcription that includes an indirect speech message, the message segment may be in the form of a content clause and the command segment may be the main clause. For example, in the statement, "tell her that she was right," the phrase "tell her" may be considered the main clause and command segment, while the phrase "that she was right" may be considered a content clause. The portion of the content clause, "she was right," that follows the conjunction, "that," may be classified as an indirect speech segment due to the clause being considered a content clause.

The form of a verb or the verb used in a message may also differ based upon whether the message is an indirect speech message or a direct speech message. For example, the verb "has" is used in the following voice input with an indirect speech message, "Tell George that he has a nice car." In a corresponding command that includes a direct speech message, the verb "have" may be used instead of "has." For example, a corresponding command that includes a direct speech message may be "Tell George: 'you have a nice car'." Thus, the verb form may be used as a signal for classifying a message segment as indirect speech.

The inclusion of personal pronouns, such as "he" or "she" may be a signal that a message segment should be classified as indirect speech, while the inclusion of the pronoun "you" may be a signal that the message segment should be classified as a direct speech message. For example, a voice input that includes a direct speech message may be "Tell Emily: 'You were right," while a corresponding voice input that includes an indirect speech segment may be "Tell Emily that she was right." In this example, the pronoun "you" was used in the direct speech message, while the pronoun "she" was used in the indirect speech message.

In some implementations, the indirect speech classifier 133 determines an indirect speech confidence score for a message segment. The indirect speech confidence score specifies a measure of confidence that the message segment is an indirect speech segment. For example, a higher indirect speech confidence score may indicate that the message segment is more likely an indirect speech segment than a lower indirect speech confidence score. The indirect speech confidence score may be based on the characteristics of the message segment and/or the command segment, such as whether the segment(s) includes a content clause, the form of verbs in the segment(s), whether the segment(s) includes personal pronouns, and/or whether the message segment(s) includes the pronoun "you."

The indirect speech segment 133 (or another element) may compare the indirect speech confidence score to an indirect speech threshold to determine whether to classify the message segment as indirect speech. If the indirect speech confidence score satisfies the indirect speech threshold, e.g., by meeting or exceeding the indirect speech threshold, the indirect speech classifier 133 may classify the message segment as an indirect speech segment.

The indirect speech classifier 133 can also classify a message segment as a direct speech segment. For example, if the indirect speech confidence score for the message segment does not satisfy the threshold, the indirect speech classifier 133 may classify the message segment as a direct speech segment. Or, the indirect speech classifier 133 may make a positive determination that the message segment is a direct speech segment by determining a direct speech confidence score that specifies a measure of confidence that the message segment is a direct speech segment and comparing that confidence score to a direct speech threshold. If the direct speech confidence score satisfies the direct speech confidence score, the indirect speech classifier 133 may classify the message segment as a direct speech segment.

If the message segment is classified as an indirect speech segment, the semantic parser 132 (or indirect speech classifier 133) provides the message segment to a machine translator 134 that converts the message segment to a direct speech segment. If the message segment is not classified as an indirect speech segment, the semantic parser 132 may provide the message segment to a message generator 136. The semantic parser 132 may also provide the command segment to the message generator 136.

In some implementations, the machine translator 134 includes or has access to a set of rules 135 that the machine translator 134 uses to convert indirect speech segments to direct speech segments. The rules 135 may include grammar rules that define how the indirect message segments are to be converted. For example, the grammar rules may specify how an indirect speech segment should be reconstructed from the point of view of another speaker, such as from a third person point of view to a first person point of view.

Some example grammar rules may specify how to transform possessive pronouns, such as "his," "her," or "our." Absent an indication that there is a third person referenced in the message segment, the pronouns "him" and "her" likely refer to the recipient of the message. Thus, a grammar rule may specify that these pronouns be replaced with the pronoun "your." If a third person is referenced in the message segment, such as in "Tell Mark that James left his book," additional rules may be applied to determine to whom the pronoun "his" refers. As the pronoun "our" refers to the sender, a grammar rule may specify that this pronoun not be replaced.

Some grammar rules may specify how to change the form and tense of verbs based on changes in the subject or object of the message segment. For example, consider the indirect message segment, "Tell Tammy that she has to pick up dinner." A grammar rule may specify that the pronoun "she" should be replaced with "you." Another grammar rule may specify that the verb "has" needs to be replaced with "have" to match the pronoun "you." The rules 135 can include many other types of grammar rules for use in converting direct speech to indirect speech.

In some implementations, the machine translator 134 is trained using training samples. Each training sample may be a message pair that includes an indirect speech message and its corresponding direct speech message. The machine translator 134 can evaluate the training samples to learn the structures of indirect speech messages and the structures of direct messages, and how to convert the indirect speech messages to direct speech messages based on their differing structures.

In some implementations, the machine translator 134 is trained as if direct speech is a different language than indirect speech. For example, machine translators can be used to translate from one language, such as English, to another language, such as French. The machine translators can translate between languages by identifying a semantic meaning of the input text and identifying words in the other language that have the same meaning. The machine translator 134 can be trained similarly to translate input indirect speech text to direct speech text based on the meaning of the input indirect speech text. Once trained, the machine translator 134 can identify a meaning of an input indirect speech message or a meaning of multiple disparate portions of the message and identify words to create a direct speech message having the same meaning. The machine translator 134 can also organize the words in an order to correspond to a direct speech format.

The machine translator 134 may be trained and/or implemented differently based on the language that it will be used to convert. For example, a rules-based machine translator may provide better translations from indirect speech to direct speech for one language, while a machine translator trained using training samples may provide better translations from indirect speech to direct speech for a different language.

Once trained, the machine translator 134 can be used to convert input text that is classified as indirect speech to direct speech. For a rules-based machine translator, the machine translator 134 can apply one or more rules to the input text to convert the text to direct speech. A machine translator trained using training samples can convert the text to direct speech by substituting words and changing the order of words based on the structures learned from the training samples and/or a meaning of the words identified by the machine translator.

The machine translator 134 can provide the converted message segment to the message generator 136. The message generator 136 generates a message using the direct speech segment and the command segment. The message generator 136 may identify an application for sending the message and a user to which to send the message based on the command segment. The application may be determined based on the text of the command segment. For example, the command segment may specify that the message be sent as a text message (e.g., "text Greg . . . ") or e-mail message (e.g., "e-mail Greg . . . "). The application may also be selected by the user, for example as a default or on a per message basis.

The message generator 136 may also determine the application for sending the message and the user to which to send the message based on context data. The context data can include data regarding a messaging application that is active or has been recently active and/or data regarding a contact from which a message was recently accessed. For example, if the user accessed a text message from a particular user named "Greg" using a text messaging application before uttering a command to send a message to "Greg" or to "him," the message generator 136 may determine that the message is intended to be a text message to the user "Greg" that sent the text message.

The message generator 136 can also use contact information to determine the intended recipient for the message. For example, if voice input includes "tell John . . . ," the message generator 136 can identify contacts that match (e.g., have the name "John"). The message generator 136 can provide any matching contacts as suggestions for the user to select from. The user can then select from the suggestions.

The message generator 136 can generate a message that includes the direct speech segment and that is addressed to the proper recipient, e.g., the determined recipient or user-selected recipient. If the application for the message is e-mail, the message generator 136 may interact with an e-mail application to generate an e-mail message that includes the direct speech segment and that is addressed to the recipient. Similarly, if the application for the message is text messaging, the message generator 136 may interact with a text messaging application to generate a text message that includes the direct speech segment and that is addressed to the recipient.

A communication transmitter 140 can send the generated message to the recipient. The communication transmitter 140 may be part of the application for which the message was generated, for example part of a text messaging application or an e-mail application. For a text messaging application, the communication transmitter 140 can access a phone number for the recipient, e.g., from a list of contacts stored on the user device 110, and transmit a text message to that phone number. For an e-mail application, the communication transmitter 140 may send an e-mail to an e-mail address of the recipient.

Figure 2:
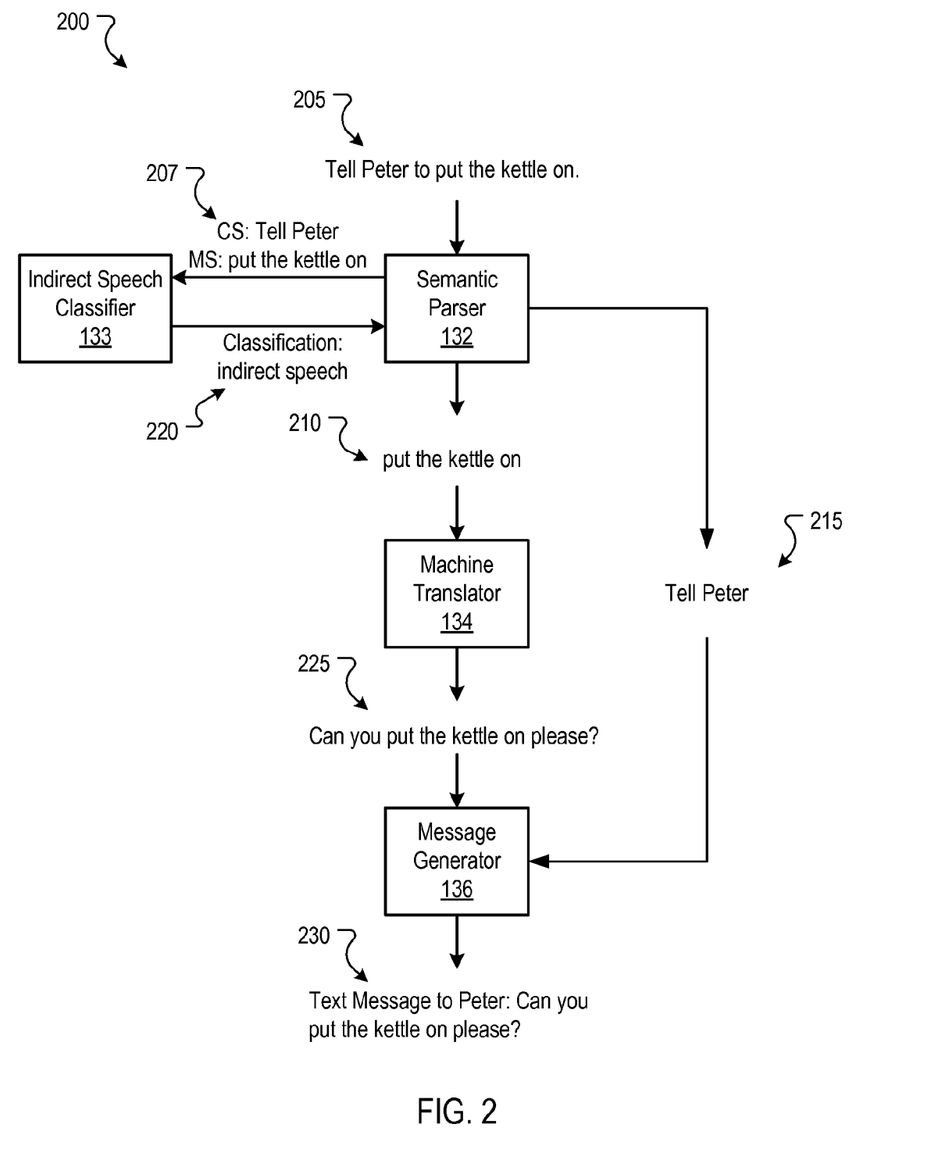
FIG. 2 is an example data flow for generating a communication based on a voice input.

FIG. 2 is an example data flow 200 for generating a communication based on a voice input. A transcription 205 of a voice input is received at a semantic parser 132. The example transcription 205 includes the text "Tell Peter to put the kettle on." The transcription 205 may be received from a speech-to-text module 131 that transcribed a voice input that corresponds to an utterance made by a user.

The semantic parser 132 processes the transcription 205 to identify a command segment and a message segment included in the transcription 205. For example, the semantic parser 132 may evaluate semantics and/or syntactic structures of the transcription 205 to identify a command segment and a message segment. In this example, the transcription 205 includes a message segment 210, "put the kettle on," and a command segment 215, "Tell Peter." The transcription 205 also includes a transitional word "to."

The semantic parser 136 may identify the command segment 215 in response to identifying that a portion of the transcription 205 includes the term "Tell" and optionally a person's name. In addition, or in the alternative, the semantic parser 136 may generate a semantic meaning for portions of the transcription 205 and identify the command segment 215 based on the meaning of the term "Tell."

The semantic parser 136 may identify the message segment 210 based on a determination that the transcription 205 includes the transitional word, "to," following the command segment 215. In addition, or in the alternative, the semantic parser 136 may identify the message segment 210 based on a semantic meaning of text included in the message segment 210.

The semantic parser 136 provides data 207 specifying the message segment 210 and optionally the command segment 215 to an indirect speech classifier 133. The indirect speech classifier 133 determines whether to classify the message segment 210 as indirect speech. The indirect speech classifier 133 may evaluate the syntactic structure of the message segment 210 and optionally the syntactic structure of the command segment 215 and determine whether to classify the message segment 210 as indirect speech based on the evaluation. The indirect speech classifier 133 can provide data 220 specifying the classification to the semantic parser 132. In this example, the indirect speech classifier 133 classified the message segment 210 as indirect speech.

In response to the message segment 210 being classified as indirect speech, the sematic parser 132 provides data specifying the message segment 210 to a machine translator 134 that converts the message segment 210 to a direct speech segment 225. The semantic parser 132 can also provide data specifying the command segment 215 to a message generator 136. The machine translator 134 may apply one or more rules, such as the rules 135 of FIG. 1 to the message segment 210 to convert the message segment 210 to the direct speech segment 225. In this example, the message segment 210, "put the kettle on," was converted to the direct speech segment 225, "Can you put the kettle on please?"

The machine translator 134 provides data specifying the direct speech segment 225 that corresponds to the message segment 210 to the message generator 136. In response, the message generator 136 generates a message 230 that includes the direct speech segment 225 and is addressed to the intended recipient. For example, the message generator 136 may interact with a text messaging application to generate a text message that includes the direct speech segment 225. In this example, the message 230 includes the direct speech segment 225, "Can you put the kettle on?" and is a text message addressed to Peter. The text messaging application can transmit the text message 230 to a user device associated with Peter.

Figure 3:
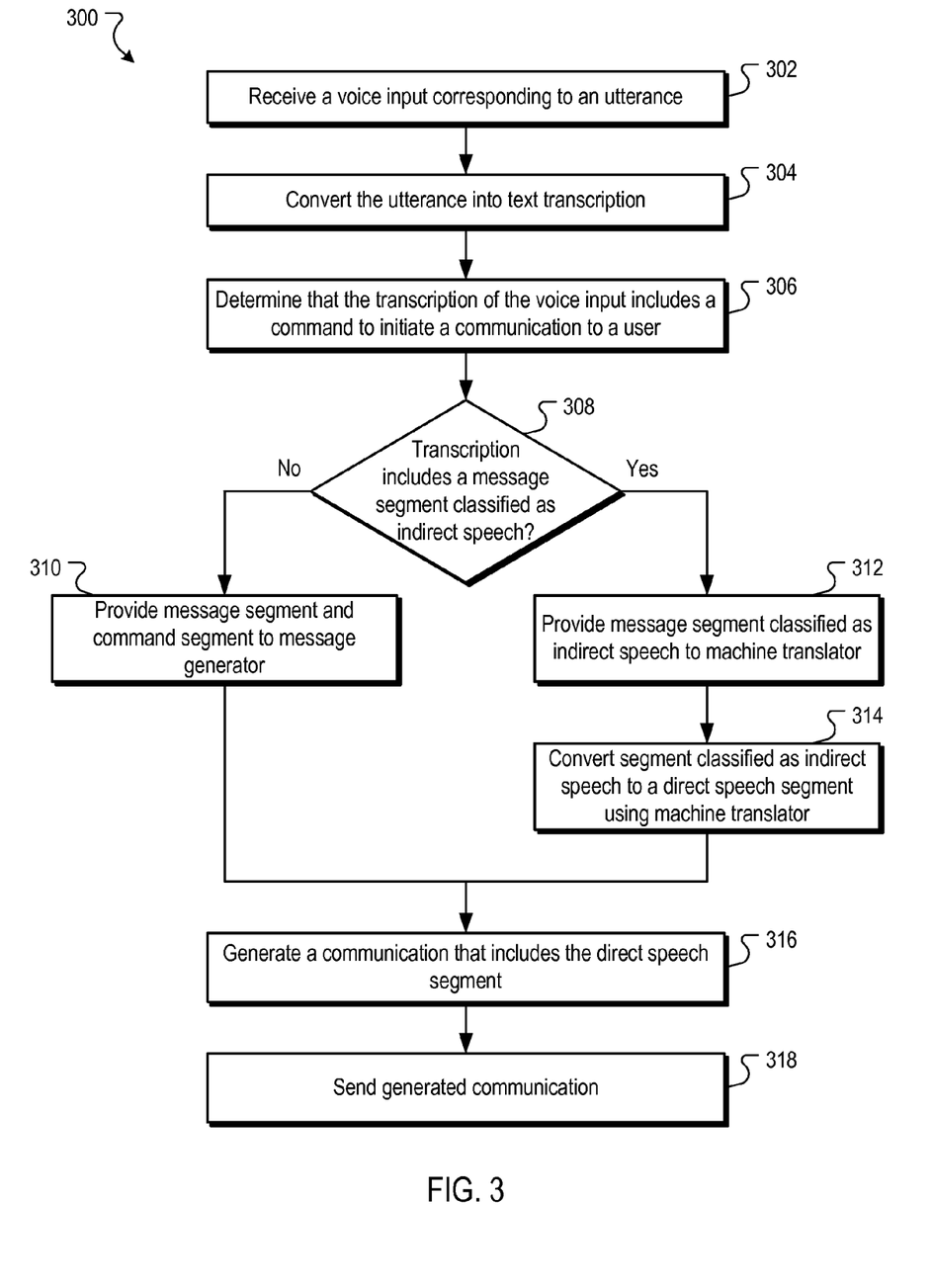
FIG. 3 is a flow chart of an example process for generating and sending a communication based on voice input that corresponds to an utterance.

FIG. 3 is a flow chart of an example process 300 for generating and sending a communication based on voice input that corresponds to an utterance. Operations of the process 300 can be implemented, for example, by one or more data processing apparatus, such as the user device 110 of FIG. 1. The process 300 can also be implemented as instructions stored on computer storage medium such that execution of the instructions by a data processing apparatus cause the data processing apparatus to perform the operations of the process 300.

A voice input is received (302). The received voice input may correspond to an utterance made by a user. For example, a user may speak a voice command into a voice input module (e.g., microphone) of a user device. The voice input may include a command to initiate a communication to another user. For example, the user may speak a command that requests that the user device send a text message to another user that is a contact of the user.

The utterance of the voice input is converted into a text transcription (304). The voice input module 120 may provide an electronic version of the utterance to a speech-to-text module 131. The speech-to-text module 131 may transcribe the utterance and provide a transcription of the utterance to a semantic parser 132.

A determination is made that the transcription includes a command to initiate a communication to another user (306). The voice input, and thus the transcription, may include a command to initiate a communication to another user. For example, the user may speak a command that requests that the user device send a text message to another user that is a contact of the user.

As described above, the semantic parser 132 can process a transcription to identify particular segments of the transcription, such as command segments and message segments. The semantic parser 132 can identify a command segment in the transcription for the voice input and determine whether the command segment is a command to initiate a communication to another user. This determination may be made based on a semantic meaning of the command segment, for example as determined by the semantic parser 132.

A determination is made whether the transcription includes a message segment classified as indirect speech (308). The semantic parser 132 may identify the message segment of the transcription, for example in response to identifying the command segment. The semantic parser 132 may identify the message segment by identifying a transitional word, such as "that" or "to," that follows the command segment. In response, the semantic parser 132 may identify the segment following the transitional word as the message segment. In addition, or in the alternative, the semantic parser 132 may identify the message segment based on a semantic meaning of the message segment as determined by the semantic parser 132.

The semantic parser 132 may provide the message segment and optionally the command segment to an indirect speech classifier 133. The indirect speech classifier 133 can process the segment(s) to determine whether to classify the message segment as indirect speech and provide the classification to the semantic parser 132, as described above.

If the message segment is not classified as indirect speech, the semantic parser 132 may provide the message segment and the command segment to a message generator 136 (310). For example, the message segment may already be in a direct speech format suitable for including in a communication to another user. If the message segment is classified as indirect speech, the semantic parser 132 may provide message segment to a machine translator 134, and provide the command segment to the message generator 136 (312).

The machine translator 134 converts the message segment from an indirect speech format to a direct speech format (314). For example, the machine translator 134 may convert the message segment based on a set of rules 135. The machine translator 134 may also convert the message segment by substituting words and adjusting the order of words based on the meaning of words in the message segment and/or structural differences learned from training data. The machine translator 134 provides the converted direct speech segment to the message generator 136.

The message generator 136 generates a communication to the other user based on the command segment and the message segment received from the semantic parser 132 or the machine translator 134 (316). If the message segment of the transcription was not classified as indirect speech, the message generator 136 generates a communication that includes the message segment of the transcription and addresses the communication to the other user. If the message segment of the transcription was classified as indirect speech, the message generator 136 generates a communication that includes the converted direct speech segment received from the machine translator 134 and addresses the communication to the other user.

In some implementations, the message generator 136 causes the generated message to be displayed by the user device so that a user can confirm the message before the message is sent. In this way, the user can confirm that the message is being sent to the correct recipient and that the message is the user's intended message before the message is sent.

The generated communication is transmitted (318). The message generator 136 may provide the generated communication to communication transmitter 140 that sends the communication to a user device 150 of the other user by way of the network 102. For example, if the message was intended to be sent by text messaging, the message generator 136 may interact with a text messaging application to generate and send a text message that includes the message segment. If the message was intended to be sent by e-mail, the message generator 134 may interact with an e-mail application to generate and send an e-mail to an e-mail account of the other user.

Figure 4:
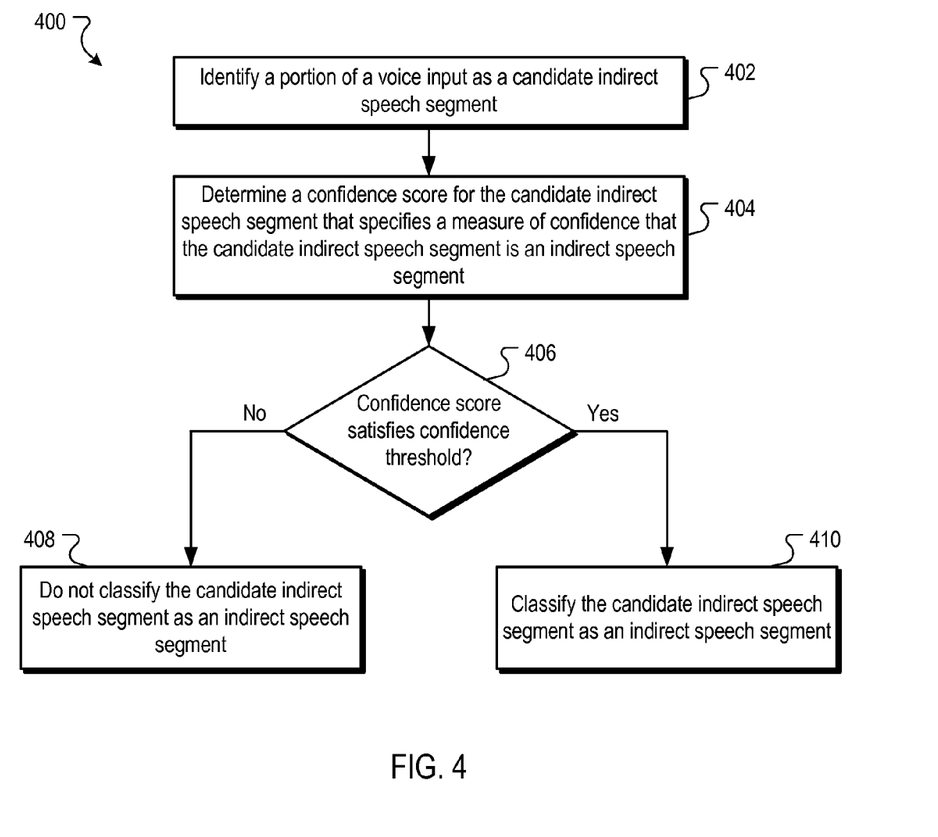
FIG. 4 is a flow chart of an example process for classifying a portion of a transcription of a voice input.

FIG. 4 is a flow chart of an example process 400 for classifying a portion of a voice input. Operations of the process 400 can be implemented, for example, by one or more data processing apparatus, such as the user device 110 of FIG. 1. The process 400 can also be implemented as instructions stored on computer storage medium such that execution of the instructions by a data processing apparatus cause the data processing apparatus to perform the operations of the process 400.

A portion of a voice input is identified as being a candidate indirect speech segment (402). For example, a transcription of a voice input may be processed by a semantic parser 132 to identify a message segment. This message segment may be considered a candidate indirect speech segment, as it has not yet been classified as indirect or direct speech.

A confidence score is determined for the candidate indirect speech segment (404). As described above, the confidence score specifies a measure of confidence that the candidate indirect speech segment is an indirect speech segment. An indirect speech classifier 133 may process the candidate indirect speech segment to determine the confidence score for the candidate indirect speech segment. The confidence score may be based on whether the segment(s) includes a content clause, the form of verbs in the segment(s), whether the segment(s) includes personal pronouns, and/or whether the message segment(s) includes one or more occurrences of the pronoun "you."

A determination is made whether the confidence score satisfies a confidence threshold (406). For example, the indirect speech classifier 133 may compare the confidence score to the confidence threshold to determine whether the confidence score meets or exceeds the confidence threshold.

If the confidence score does not satisfy the confidence threshold, the indirect speech classifier 133 may not classify the candidate indirect speech segment as an indirect speech segment (408). If the confidence score satisfies the confidence threshold, the indirect speech classifier 133 may classify the candidate indirect speech segment as an indirect speech segment (410).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a voice input corresponding to an utterance;
   determining, by a voice command processor, that a transcription of the utterance includes: (i) at least one command word associated with a voice command for initiating a communication, (ii) a reference to a message recipient, and (iii) a message;
   classifying the message as likely written in a form of speech that (i) is directed to the voice command processor and not to the message recipient, and (ii) is not to be directly quoted in the communication;
   in response to the classifying, translating the message to a form of speech that (i) is directed to the message recipient and not to the voice command processor, and (ii) is to be directly quoted in the communication; and
   initiating the communication that includes the translated message.

2. The method of claim 1, wherein classifying the message as likely written in the form of speech that (i) is directed to the voice command processor and not to the message recipient, and (ii) is not to be directly quoted in the communication, comprises:
   determining a confidence score associated with the message based at least on (i) whether the message corresponds to a form of speech associated with a person reporting a message to another person or a person requesting another entity to report a message, (ii) whether the message includes a personal pronoun, (iii) a form of a verb in the message, or (iv) a content clause in the at least one command word or in the message; and
   comparing the confidence score to a threshold value.

3. The method of claim 2, wherein the message is classified as likely to be written in the form of speech that (i) is directed to the voice command processor and not to the message recipient, and (ii) is not to be directly quoted in the communication, when the confidence score satisfies the threshold value.

4. The method of claim 3, wherein the form of speech that (i) is directed to the voice command processor and not to the message recipient, and (ii) is not to be directly quoted in the communication comprises indirect speech.

5. The method of claim 1, wherein determining, by the voice command processor, that the transcription of the utterance includes: (i) the at least one command word associated with the voice command for initiating the communication, (ii) the reference to the message recipient, and (iii) the message, comprises:
   segmenting portions of the transcription based on at least one of a meaning, a syntactic structure, a keyword, and a transitional word of the transcription.

6. The method of claim 1, wherein translating the message that is classified as likely written in the form of speech that (i)

is directed to the voice command processor and not to the message recipient, and (ii) is not to be directly quoted in the communication, comprises:

replacing at least one word of the message with a different word that communicates direct speech, such that at least a grammatical structure, or a tense of one or more words of the message is changed.

7. The method of claim 1, wherein initiating the communication comprises:

identifying, based on the at least one command word, an application for transmitting the translated message; and     transmitting the translated message using the application.

8. A system, comprising:

a voice command processor; and a memory storage apparatus in data communication with the voice command processor, the memory storage apparatus storing instructions executable by the voice command processor and that upon such execution cause the voice command processor to perform operations comprising:

receiving a voice input corresponding to an utterance;

determining that a transcription of the utterance includes: (i) at least one command word associated with a voice command for initiating a communication, (ii) a reference to a message recipient, and (iii) a message;

classifying the message as likely written in a form of speech that (i) is directed to the voice command processor and not to the message recipient, and (ii) is not to be directly quoted in the communication;

in response to the classifying, translating the message to a form of speech that (i) is directed to the message recipient and not to the voice command processor, and (ii) is to be quoted directly in the communication; and         initiating the communication that includes the translated message.

9. The system of claim 8, wherein classifying the message as likely written in the form of speech that (i) is directed to the voice command processor and not to the message recipient, and (ii) is not to be directly quoted in the communication, comprises:

determining a confidence score associated with the message based at least on (i) whether the message corresponds to a form of speech associated with a person reporting a message to another person or a person requesting another entity to report a message, (ii) whether the message includes a personal pronoun, (iii) a form of a verb in the message, or (iv) a content clause in the at least one command word or in the message; and     comparing the confidence score to a threshold value.

10. The system of claim 9, wherein the message is classified as likely to be written in the form of speech that (i) is directed to the voice command processor and not to the message recipient, and (ii) is not to be directly quoted in the communication, when the confidence score satisfies the threshold value.

11. The system of claim 10, wherein the form of speech that (i) is directed to the voice command processor and not to the message recipient, and (ii) is not to be directly quoted in the communication comprises indirect speech.

12. The system of claim 8, wherein determining, by the voice command processor, that the transcription of the utterance includes: (i) the at least one command word associated with the voice command for initiating the communication, (ii) the reference to the message recipient, and (iii) the message, comprises:

segmenting portions of the transcription based on at least one of a meaning, a syntactic structure, a keyword, and a transitional word of the transcription.

13. The system of claim 8, wherein translating, by the voice command processor, the message that is classified as likely written in the form of speech that (i) is directed to the voice command processor and not to the message recipient, and (ii) is not to be directly quoted in the communication, comprises:

replacing at least one word of the message with a different word that communicates direct speech, such that at least a grammatical structure, or a tense of one or more words of the message is changed.

14. The system of claim 8, wherein initiating, by the voice command processor, the communication comprises:

identifying, based on the at least one command word, an application for transmitting the translated message; and     transmitting the translated message using the application.

15. A non-transitory computer storage medium encoded with a computer program, the program comprising instructions that upon execution by a voice command processor cause the voice command processor to perform operations comprising:

receiving a voice input corresponding to an utterance;

determining that a transcription of the utterance includes: (i) at least one command word associated with a voice command for initiating a communication, (ii) a reference to a message recipient, and (iii) a message;

classifying the message as likely written in a form of speech that (i) is directed to the voice command processor and not to the message recipient, and (ii) is not to be directly quoted in the communication;

in response to the classifying, translating the message to a form of speech that (i) is directed to the message recipient and not to the voice command processor, and (ii) is to be quoted directly in the communication; and     initiating the communication that includes the translated message.

16. The non-transitory computer storage medium of claim 15, wherein classifying the message as likely written in the form of speech that (i) is directed to the voice command processor and not to the message recipient, and (ii) is not to be directly quoted in the communication, comprises:

determining a confidence score associated with the message based at least on (i) whether the message corresponds to a form of speech associated with a person reporting a message to another person or a person requesting another entity to report a message, (ii) whether the message includes a personal pronoun, (iii) a form of a verb in the message, or (iv) a content clause in the at least one command word or in the message; and     comparing the confidence score to a threshold value.

17. The non-transitory computer storage medium of claim 16, wherein the message is classified as likely to be written in the form of speech that (i) is directed to the voice command processor and not to the message recipient, and (ii) is not to be directly quoted in the communication, when the confidence score satisfies the threshold value.

18. The non-transitory computer storage medium of claim 17, wherein the form of speech that (i) is directed to the voice command processor and not to the message recipient, and (ii) is not to be directly quoted in the communication comprises indirect speech.

19. The non-transitory computer storage medium of claim 15, wherein determining, by the voice command processor, that the transcription of the utterance includes: (i) the at least one command word associated with the voice command for initiating the communication, (ii) the reference to the message recipient, and (iii) the message, comprises:
    segmenting portions of the transcription based on at least one of a meaning, a syntactic structure, a keyword, and a transitional word of the transcription.

20. The non-transitory computer storage medium of claim 15, wherein translating the message that is classified as likely written in the form of speech that (i) is directed to the voice command processor and not to the message recipient, and (ii) is not to be directly quoted in the communication, comprises:
    replacing at least one word of the message with a different word that communicates direct speech, such that at least a grammatical structure, or a tense of one or more words of the message is changed.

\* \* \* \* \*